(12) United States Patent
Lee et al.

(10) Patent No.: US 7,628,525 B2
(45) Date of Patent: Dec. 8, 2009

(54) ILLUMINATION DEVICE FOR REFRIGERATOR

(75) Inventors: Bong Kook Lee, Gimhae (KR); Ki Cheol Woo, Masan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/633,519

(22) Filed: Dec. 5, 2006

(65) Prior Publication Data
US 2007/0127229 A1   Jun. 7, 2007

(30) Foreign Application Priority Data
Dec. 5, 2005 (KR) .................. 10-2005-0117664
Jan. 24, 2006 (KR) .................. 10-2006-0007458
Jan. 25, 2006 (KR) .................. 10-2006-0007862

(51) Int. Cl.
F21V 7/04 (2006.01)

(52) U.S. Cl. .................. 362/602; 362/92

(58) Field of Classification Search .......... 362/602, 362/612, 600, 92, 94, 294, 373, 631–634
See application file for complete search history.

(56) References Cited

U.S. PATENT DOCUMENTS

| | | | |
|---|---|---|---|
| 5,287,252 A * | 2/1994 | Caruso ............... | 362/92 |
| 5,758,944 A * | 6/1998 | Jandron .............. | 362/499 |
| 5,953,842 A * | 9/1999 | Bodell ................ | 40/570 |
| 6,210,013 B1 * | 4/2001 | Bousfield ............ | 362/92 |
| 6,786,562 B2 * | 9/2004 | Obrock et al. ....... | 312/408 |
| 6,871,981 B2 * | 3/2005 | Alexanderson et al. | 362/294 |
| 7,107,779 B2 * | 9/2006 | Avenwedde et al. .. | 62/264 |
| 2003/0137828 A1 * | 7/2003 | Ter-Hovhannisian .. | 362/92 |
| 2004/0264160 A1 * | 12/2004 | Bienick ............... | 362/31 |

FOREIGN PATENT DOCUMENTS

| | | |
|---|---|---|
| JP | 2002364972 | * 12/2002 |
| KR | 1995-0015061 | 6/1995 |
| KR | 10-1999-026730 | 4/1999 |
| KR | 10-2002-0035819 | 5/2002 |
| KR | 10-2005-0001384 A | 1/2005 |

* cited by examiner

*Primary Examiner*—Jong-Suk (James) Lee
*Assistant Examiner*—Julie A Shallenberger
(74) *Attorney, Agent, or Firm*—KED & Associates LLP

(57) ABSTRACT

A light source for a refrigerator includes a power supply and a light emitting diode (LED) module. A light emitting portion of the LED module may be located in the interior of a rear end of a shelf plate.

4 Claims, 12 Drawing Sheets ial design of the power supply 11 or the like should be further changed depending on a rated voltage of the light source device to be replaced (for example, a maximum rated voltage of a currently available light emitting diode is about 3.4 V).
ILLUMINATION DEVICE FOR REFRIGERATOR

BACKGROUND OF THE INVENTION

1. Field of the Invention

The present invention relates to a refrigerator, and more specifically, to an illumination device of a refrigerator for illuminating a storage space in the refrigerator.

2. Description of the Related Art

A refrigerator is an electronic appliance for refrigerating or freezing foods to freshly store them for a long time. In general, a storage space is defined within a main body of a refrigerator and selectively opened or closed by means of a door. Further, an illumination device for illuminating the storage space is provided in the refrigerator.

FIG. 11 is a view schematically showing the configuration of an illumination device of a refrigerator according to a prior art.

As shown in this figure, the related art illumination device for a refrigerator comprises a power supply 11 for rectifying and converting commercial AC voltage generally supplied to a household into operating voltage commonly used in a refrigerator, a halogen lamp 12 which is supplied with the voltage from the power supply 11 and blinks on or off to selectively illuminate a storage space in a refrigerator, and a door switch 13 which is switched on or off in accordance with an opening or closing operation of a door for selectively opening or closing the storage space. Here, the halogen lamp 12 generally has a rated voltage of 12 V.

FIG. 12 is a front view showing the interior of a refrigerator in which the related art illumination device for the refrigerator is provided.

As shown in this figure, a predetermined storage space 21 is defined in a main body 20 of the refrigerator. The storage space 21 is a place where foods are stored, and is selectively opened or closed by means of a door 22 which is pivoted on the main body 20.

A lamp housing 23 is installed on a certain position in the storage space 21. For example, the lamp housing 23 is provided at a position on a rear surface in the storage space 21. The lamp housing 23 is provided with a predetermined space and a portion of the space is formed into a cutout 24 by partially cutting out a front side of the lamp housing.

The lamp housing 23 is provided with a lamp holder 25 in which the halogen lamp 27 is installed. The halogen lamp 27 is turned on or off due to the opening or closing operation of the door 22 in order to perform a function of selectively illuminating the interior of the storage space 21. Light from the halogen lamp 27 is transmitted into the storage space 21 through the cutout 24 of the lamp housing 23.

However, the aforementioned related art illumination device for a refrigerator has the following problems:

As described above, the halogen lamps 12 and 27 are used as a light source device in the conventional illumination device. However, in order to replace the halogen lamp 12 with a relatively excellent light source device in view of power consumption, amount of heat radiation, life or the like, e.g. a light emitting diode, the circuit configuration of an illumination device, the internal design of the power supply 11 or the like should be further changed depending on a rated voltage of the light source device to be replaced (for example, a maximum rated voltage of a currently available light emitting diode is about 3.4 V).

Further, the halogen lamp 12 has a limitation in increasing the brightness in the storage space due to its heat radiation. Therefore, it is likely to insufficiently illuminate the storage space 21.

In addition, the conventional illumination device is generally provided on a rear surface, a rear end of the ceiling or the like of the storage space 21. Therefore, it is likely to inefficiently illuminate the storage space 21 since light from the halogen lamp 27 is blocked foods stored in the storage space 21.

Moreover, when it is turned on, the halogen lamp 27 emits an amount of heat radiation relatively larger than that of the other light source devices. Therefore, since the temperature in the storage space 21 is increased due to the heat radiation from the halogen lamp 27 in the process of illuminating the storage space 21, there is a problem in that foods cannot be freshly stored.

Furthermore, the halogen lamp 27 has life shorter than the other light source device such as a light source device. Therefore, there is inconvenience in that a user should replace the halogen lamp 27 frequently.

In general, a glass bulb is used in the halogen lamp 27. Therefore, it is highly likely that the illumination lamp 27 is damaged in the process of utilizing a refrigerator or replacing the illumination lamp 27.

Finally, according to the prior art, the lamp housing Z3 and the lamp holder 25 should be installed at one side of the storage space 21, and then, the illumination lamp 27 should be installed to the lamp holder 25. Therefore, there is another problem in that it is troublesome to install the illumination lamp 27.

SUMMARY OF THE INVENTION

The present invention is conceived to solve the aforementioned problems in the prior art. Accordingly, an object of the present invention is to provide an illumination device for a refrigerator wherein another light source device can be utilized in a simpler way.

Another object of the present invention is to provide an illumination device for a refrigerator capable of more efficiently illuminating a storage space of the refrigerator.

A further object of the present invention is to provide an illumination device for a refrigerator capable of minimizing the reduction in refrigeration efficiency.

A still further object of the present invention is to provide an illumination device for a refrigerator capable of minimizing the reduction in storage capacity.

A still further object of the present invention is to provide an illumination device for a refrigerator capable of minimizing the damage of the refrigerator.

A still further object of the present invention is to provide an illumination device for a refrigerator which can be more simply mounted to the refrigerator. According to an aspect of the present invention for achieving the object, there is provided an illumination device for illuminating a storage space in a refrigerator, comprising: a power supply for rectifying and reducing commercial AC voltage to operating voltage; and at least one light emitting diode module with a rated voltage corresponding to the operating voltage from the power supply, the light emitting diode module supplied with the operating voltage from the power supply and selectively emitting light to illuminate the storage space.

Preferably, the light emitting diode module comprises a plurality of light emitting diodes connected in series with one another.

More preferably, the operating voltage from the power supply and the rated voltage of the light emitting diode module are 12 V.

The operating voltage from the power supply is applied to the light emitting diode module through a door switch that is switched on or off by means of a door for selectively opening or closing the storage space.

According to another aspect of the present invention for achieving objects, there is an illumination device for illuminating a storage space in a refrigerator, comprising: a shelf detachably installed into the storage space; and a light emitting diode module provided at a portion of the shelf to generate light for illuminating the storage space.

Preferably, the shelf is provided with a light transmissive member through which light from the light emitting diode module is transmitted.

More preferably, he light transmissive member is a shelf plate provided inside a shelf frame constituting the shelf.

The light emitting diode module comprises at least one light emitting diode which includes an electrode section for receiving voltage and a light emitting section for emitting light by means of the voltage received from the electrode section.

The electrode section is provided at a rear end of the shelf frame, and the light emitting section is provided in the interior of a rear end of the shelf plate.

More preferably, a side in the storage space and a corresponding side of the shelf are provided with male and female connectors which are connected with each other to apply voltage to the light emitting diode module when the shelf is completely coupled with the storage space.

A wiring section connected with the electrode section of the light emitting diode is provided at the rear end of the shelf frame; the female connectors are provided at both lateral sides of the rear ends of the shelf frame, respectively, and connected with the wiring section; the male connectors are provided at rear ends of the support grooves, respectively; and the male and female connectors are engaged with each other to apply voltage to the light emitting diode module when the lateral ends of the shelf are inserted in the support grooves to support the shelf.

More preferably, the shelf is supported in such a state where both lateral ends of the shelf are inserted in support grooves provided at both lateral sides of the storage space, respectively.

The shelf is supported by support brackets in such a state where both lateral ends of the shelf are inserted in support grooves of the support brackets provided at both lateral sides of the storage space, respectively.

According to another aspect of the present invention for achieving objects, there is an illumination device for a refrigerator, comprising: an illuminating source for illuminating a storage space; an illuminating cover installed at one side of the storage space in a state where the illuminating source is mounted thereto; a first fixing means for fixing the illuminating source to the illuminating cover; and a second fixing means for fixing the illuminating cover to the storage space.

Preferably, the illuminating source comprises: a heat radiation plate provided with a printed circuit board at one surface thereof; a light emitting diode module installed to the printed circuit board; and a molding portion molded onto the surface of the heat radiation plate formed with the printed circuit board.

More preferably, the first fixing means includes: at least one pair of through-holes formed at both lateral ends of the heat radiation plate; and at least one pair of coupling bosses provided at positions on an inner surface of the illuminating cover corresponding to the through-holes such that coupling screws penetrated the through-holes of the heat radiation plate are fastened into the coupling bosses.

The first fixing means includes: at least one through-hole formed at one lateral end of the heat radiation plate; at least one coupling boss provided at a position on an inner surface of the illuminating cover corresponding to the through-hole such that a coupling screw penetrated the through-hole of the heat radiation plate is fastened into the coupling boss; and at least one coupling groove provided at another position on the inner surface of the illuminating cover opposite to the coupling boss such that the other lateral end of the heat radiation plate opposite to the through-hole is inserted in the coupling groove.

More preferably, the second fixing means includes: at least one pair of through-holes formed at both lateral sides of the illuminating cover, respectively; at least one pair of through-holes formed on a side of the storage space corresponding to the through-holes of the illuminating cover, respectively; and at least one pair of coupling bushes formed at the back of the storage space corresponding to the through-holes in the storage space such that coupling screws sequentially penetrated the through-holes of the illuminating cover and the through-holes in the storage space are fastened to the coupling bushes.

The second fixing means includes: at least one through-hole formed at one lateral side of the illuminating cover; at least one coupling piece provided at the other side of the illuminating cover opposite to the through-hole; at least one through-hole formed on a side of the storage space corresponding to the through-hole of the illuminating cover; at least one coupling bush formed at the back of the storage space corresponding to the through-hole in the storage space such that a coupling screw sequentially penetrated the through-hole of the illuminating cover and the through-hole in the storage space is fastened to the coupling bush; and at least one coupling slot formed at another side of the storage space corresponding to the coupling piece of the illuminating cover such that the coupling piece of the illuminating cover is inserted in the slot.

According to the present invention, another light source device can be used in a simpler way, the storage space can be more efficiently illuminated, both the reduction in refrigeration efficiency and storage capacity and the damage of the refrigerator can be minimized, and the illumination device for a refrigerator can be more simply mounted to the refrigerator.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of an illumination device according to the present invention will be described in detail with reference to the accompanying drawings.

Figure 1:
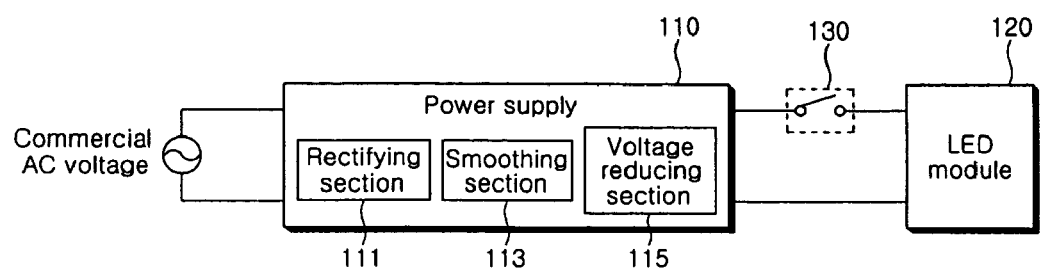
FIG. 1 is a view schematically showing the configuration of an illumination device according to a preferred embodiment of the present invention.
Figure 2:
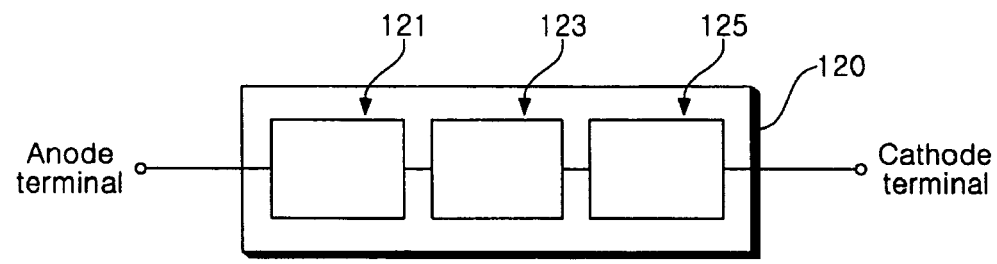
FIG. 2 is a view schematically showing the configuration of a light emitting diode constituting the illuminating device according to the preferred embodiment of the present invention.

FIG. 1 is a view schematically showing the configuration of an illumination device according to a preferred embodiment of the present invention, and FIG. 2 is a view schematically showing the configuration of a light emitting diode constituting the illuminating device according to the preferred embodiment of the present invention.

As shown in these figures, the refrigerator illumination device according to this embodiment of the present invention comprises a power supply 110 for rectifying and reducing commercial AC voltage generally supplied to a household into operating voltage, at least one or more light emitting diodes 120 which are supplied with the operating voltage from the power supply 110 and selectively emit light to illuminate a storage space in a refrigerator, and a door switch 130 which is switched on or off by means of a door for selectively opening or closing the storage space to allow the operating voltage from the power supply 10 to be selectively applied to the light emitting diodes 120.

The power supply 110 has a function of rectifying and reducing a commercial AC voltage of AC 220 V into an operating voltage of 12 V. To this end, the power supply 110 includes a rectifying section 111, a smoothing section 113 and a voltage reducing section 115. For example, the power supply 110 may include a diode circuit for rectification, a capacitor for smoothing and a transformer for voltage reduction. The operating voltage from the power supply 110 may be applied to other parts constituting a refrigerator, e.g. a compressor constituting a refrigeration cycle, a display unit or the like.

Furthermore, the light emitting diode module 120 is preferably installed in such a manner that the module is directed to the storage space to allow light to be efficiently irradiated into the storage space. For example, the light emitting diode module 120 may be installed to a rear end of the ceiling or an upper end of a rear side of the storage space. The light emitting diode module 120 is composed of at least one or more light emitting diodes to allow predetermined brightness to be obtained in the storage space.

The light emitting diode module 120 has a rated voltage of 12 V corresponding to the operating voltage from the power supply 110. Thus, a design change of the power supply 110 for conversion of voltage from the power supply 110 (e.g., replacement for change of a reduction ratio of the transformer) is not required. Further, since the rated voltage of the power supply 110 is identical to that of the common halogen lamp, the circuit design change of the illumination device is also not required.

Figure 3:
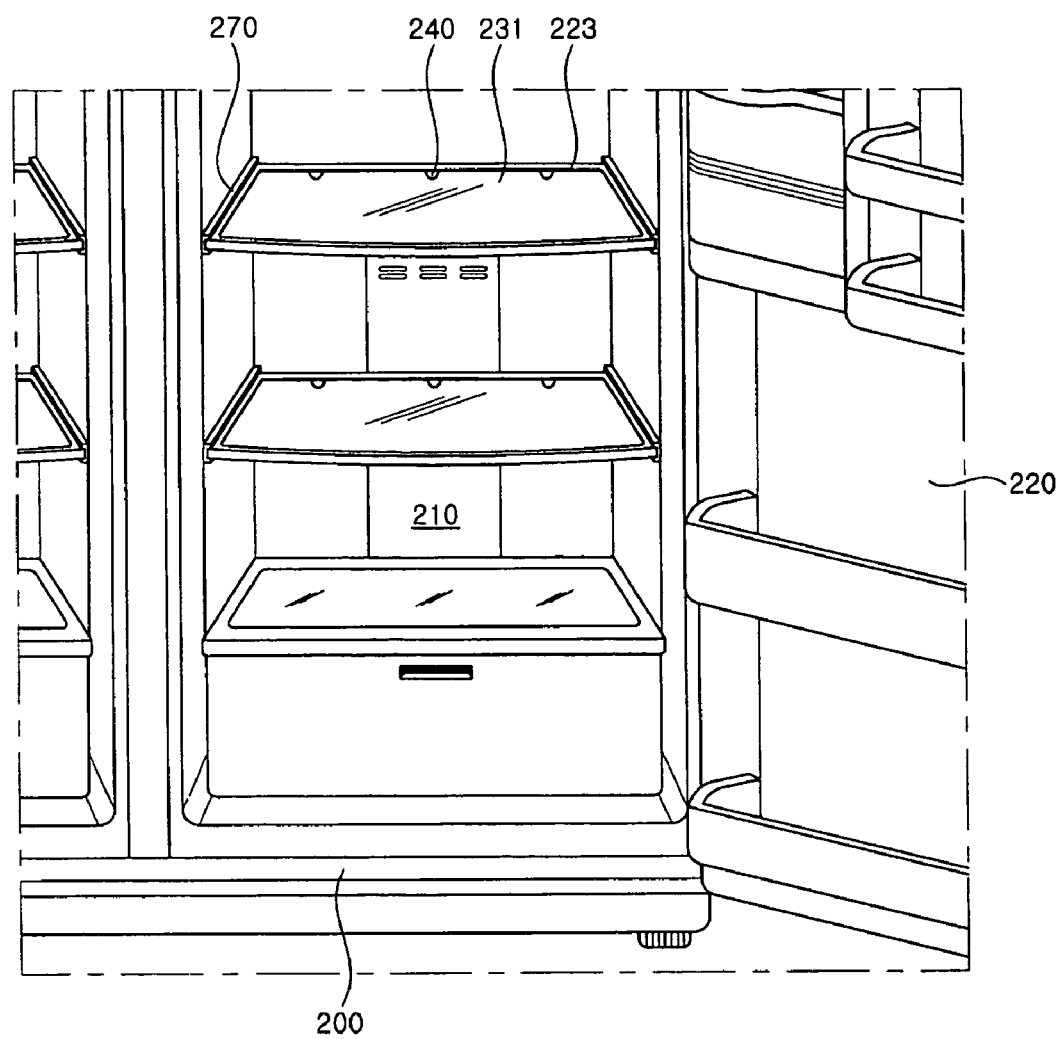
FIG. 3 is a front view showing the interior of a refrigerator provided with an illumination device of a refrigerator according to a second embodiment of the present invention.

As shown in FIG. 3, an anode terminal of the light emitting diode module 120 is selectively connected to the power supply depending on the on/off operation of the door switch 130 to receive the operating voltage and current. Further, a cathode terminal of the light emitting diode module 120 is connected (grounded) to the power supply 110.

The light emitting diode module 120 is composed of three light emitting diodes 121, 123 and 125 connected in series with one another. The light emitting diodes 121, 123 and 125 operate at a rated voltage of 3.4 V and an input current of 130~350 mA. Therefore, the rated voltage of the entire light emitting diode module 120 becomes about 10.2 V and consumes an electric power of 10.2~11.9 W.

The rated voltage of the entire light emitting diode module 120 is smaller than the operating voltage of the power supply 110. However, in consideration of wire and power consumption due to the door switch 130, the light emitting diode module 120 can be driven to emit light by means of the operating voltage applied from the power supply 110.

The light emitting diode module 120 is composed of at least one or more light emitting diodes 121, 123 and 125 connected in series with one another such that its rated voltage corresponds to the operating voltage of the power supply 110. Therefore, the number of light emitting diodes constituting the light emitting diode module 120 can be changed depending on the rated voltage of the light emitting diodes 121, 123 and 125.

In the light emitting diodes 121, 123 and 125, a white light source can be utilized such that a user can more correctly confirm foods stored in the storage space and light sources of different colors can be utilized such that a mixed color of the respective colors can be emitted. The light emitting diodes 121, 123 and 125 are preferably spaced apart from one another in consideration of light interference compensation to ensure predetermined brightness in the storage space. Further, in a case where each of the light emitting diodes 121, 123 and 125 has a rated voltage lower than the aforementioned rated voltage and four or more diodes are connected in series with one another, each pair of two diodes are spaced apart from one another to enhance the brightness in the storage space.

Although it has not been illustrated, the light emitting diode module 120 may include a reflection plate for reflecting light from the light emitting diodes 121, 123 and 125 toward the storage space. Further, the light emitting diode module 120 may include a cooling fin for cooling the light emitting diodes 121, 123 and 125. Of course, the light emitting diodes 121, 123 and 125 can be cooled by means of cold air circulating in the storage space. Moreover, the light emitting diode module 120 may be provided with a light transmissive cover member (not shown) for preventing the light emitting diodes 121, 123 and 125 from being exposed directly to the storages space. Therefore, the light transmissive cover member can prevent the light emitting diodes 121, 123 and 125 from being brought into contact with foods stored in the storage space and with the cold air circulating in the storage space.

Furthermore, the door switch 130 is configured such that both ends thereof are connected to the power supply 110 and the anode terminal of the light emitting diode module 120, respectively, such that the operating voltage can be selectively applied to the anode terminal of the light emitting diode module 120. The door switch 130 can be operated in accordance with the operation of a refrigerator door. That is, if the door is opened, the door switch 130 is switched on such that the operating voltage of the power supply 110 can be applied to the light emitting diode module 120. In addition, if the door is closed, the door switch 130 is switched off such that the operating voltage of the power supply 110 cannot be applied to the light emitting diode module 120. The door switch 130 may be a switch using a magnetic sensor, a general push switch (for example, a limit switch) or the like.

Next, a second embodiment of an illumination device for a refrigerator according to the present invention will be described in more detail with reference to the accompanying drawings.

Figure 4:
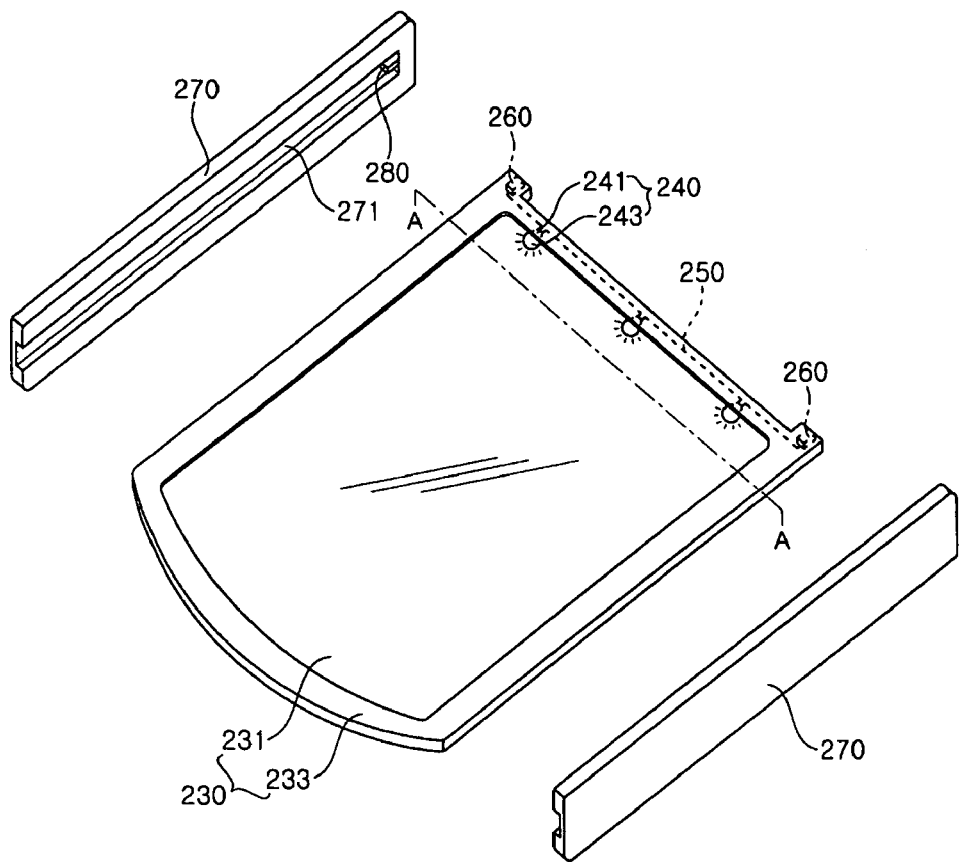
FIG. 4 is an exploded perspective view showing a shelf provided with the illumination device according to the second embodiment of the present invention and a support bracket for supporting the shelf.
Figure 5:
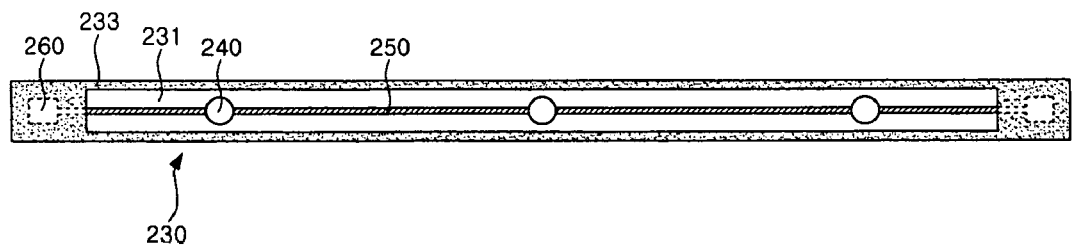
FIG. 5 is a sectional view showing the shelf provided with the illumination device according to the second embodiment of the present invention.

FIG. 3 is a front view showing the interior of a refrigerator provided with an illumination device for a refrigerator according to a second embodiment of the present invention, FIG. 4 is an exploded perspective view showing a shelf provided with the illumination device according to the second embodiment of the present invention and a support bracket for supporting the shelf, and FIG. 5 is a sectional view showing the shelf provided with the illumination device according to the second embodiment of the present invention.

As shown in the figures, a storage space 210 for storing foods therein is provided within a main body 200 of a refrigerator. The main body 210 is provided with a door 220 for selectively opening or closing the storage space 210, which can be pivoted in a forward and rearward direction.

A door switch (not shown) is provided at a portion on a front surface of the main body 220. The door switch is switched on or off as the door 220 opens or closes the storage space 210. That is, the door switch is switched on if the door 220 is opened, and the door switch is switched off if the door 220 is closed.

Furthermore, a plurality of shelves 230 are provided within the storage space 210. Each of the shelves 230 is detachably installed within the storage space 210 to partition the storage space 210 in a vertical direction.

As shown in FIG. 4, the shelf 230 is composed of a shelf plate 231 and a shelf frame 233. The shelf plate 231 is a portion where foods are substantially placed, and are made of a transparent or translucent material in the shape of a rectangle. Further, the shelf frame 233 is provided along an edge of the shelf plate 231 to perform a function of supporting the shelf plate 231.

A light emitting diode module is provided in a shelf frame 233. The light emitting diode module illuminates the storage space 210 and includes a plurality of light emitting diodes 240. Each of the light emitting diodes 240 includes a light emitting section 241 for emitting light and an electrode section 243 for applying voltage to the light emitting section. Preferably, a power light emitting diode (power LED) with a rated current of at least 300 mA is employed as the light emitting diodes 240.

The light emitting diode 240 is provided on the shelf 230. As shown in FIG. 4, the plurality of light emitting diodes 240 are spaced apart from one another shelves 240 from side to side by a predetermined distance at a rear end of the shelf 230. At this time, the light emitting section 241 is provided in the interior of a rear end of the shelf plate 231 and the electrode section 243 is provided in the interior of a rear end of the shelf frame 233 adjacent to the rear end of the shelf plate 231.

A wiring section 250 is provided in the rear end of the shelf frame 233. The wiring section 250 is connected to the electrode section 243 for the voltage application. Preferably, the wiring section 250 is installed in the rear end of the shelf frame 233 such that it is not exposed to the outside. Further, the wiring section 250 extends toward both lateral sides of the rear end of the shelf frame 233.

In addition, the lateral sides of the rear end of the shelf frame 233 are provided with female connectors 260, respectively. The female connectors 260 are connected to both ends of the wiring section 250, respectively.

Furthermore, support brackets 270 for supporting each shelf 230 are provided at both side surfaces of the storage space 210. Each of the support brackets 270 is formed with a supporting groove 271 in a forward and rearward direction. The supporting groove 271 is to support the shelf 230 which is installed in the storage space 210. Both lateral sides of the shelf 230, i.e. substantially lateral sides of the shelf frame 233, are slid along and fitted in the supporting groove 271.

Male connectors 280 are provided at rear ends of the supporting groove 271, respectively. Each of the male connectors 280 is provided with a coupling terminal. The male connector 280 is connected to a power source in a refrigerator, and preferably, to a power supply (not shown) for rectifying and reducing commercial AC voltage into operating voltage. Further, the male connector 280 is connected with the female connector 260 to apply voltage to the light emitting diodes 240 when the lateral sides of the shelf 230 are slid along and fitted in the supporting groove 271.

Hereinafter, an operation of an illumination device for a refrigerator according to the preferred embodiments of the present invention will be explained.

First, the shelf 230 is mounted into the storage space 210 of a refrigerator. At this time, both lateral sides of the shelf 230, i.e. both lateral sides of the shelf frame 233, are slid along and fitted in the supporting grooves 271, so that the shelf 230 can be mounted into the storage space.

If both lateral sides of the shelf 230 are completely slid up to the rear ends of the supporting grooves 271, the female connectors 260 are connected with the male connectors 280 to be in a state where voltage can be applied to the light emitting diodes 240. In such a state, if the door 220 is pivotally moved to open the storage space 210, the door switch is switched on. Therefore, since the voltage is applied to the light emitting diodes 240, the light emitting diodes 240 can emit light.

At this time, light from the light emitting diodes 240 is irradiated into the storage space 210 from the interior of the shelf plate 231. A reflective index of the shelf plate 231 is different from that of air, the light from the light emitting diodes 240 is diffracted and reflected to propagate along the interior of the shelf plate 231. Therefore, the light from the light emitting diodes 240 can be irradiated up to the front of the shelf plate 231, i.e. the front of the storage space 210.

A user puts foods into and out of the storage space 210 illuminated by the light emitting diodes 240 and then pivotally moves the door 220 to close the storage space 210. Therefore, the door switch is switched off such that the voltage applied to the light emitting diodes 240 is shut off to turn off the light emitting diodes 240.

Figure 6:
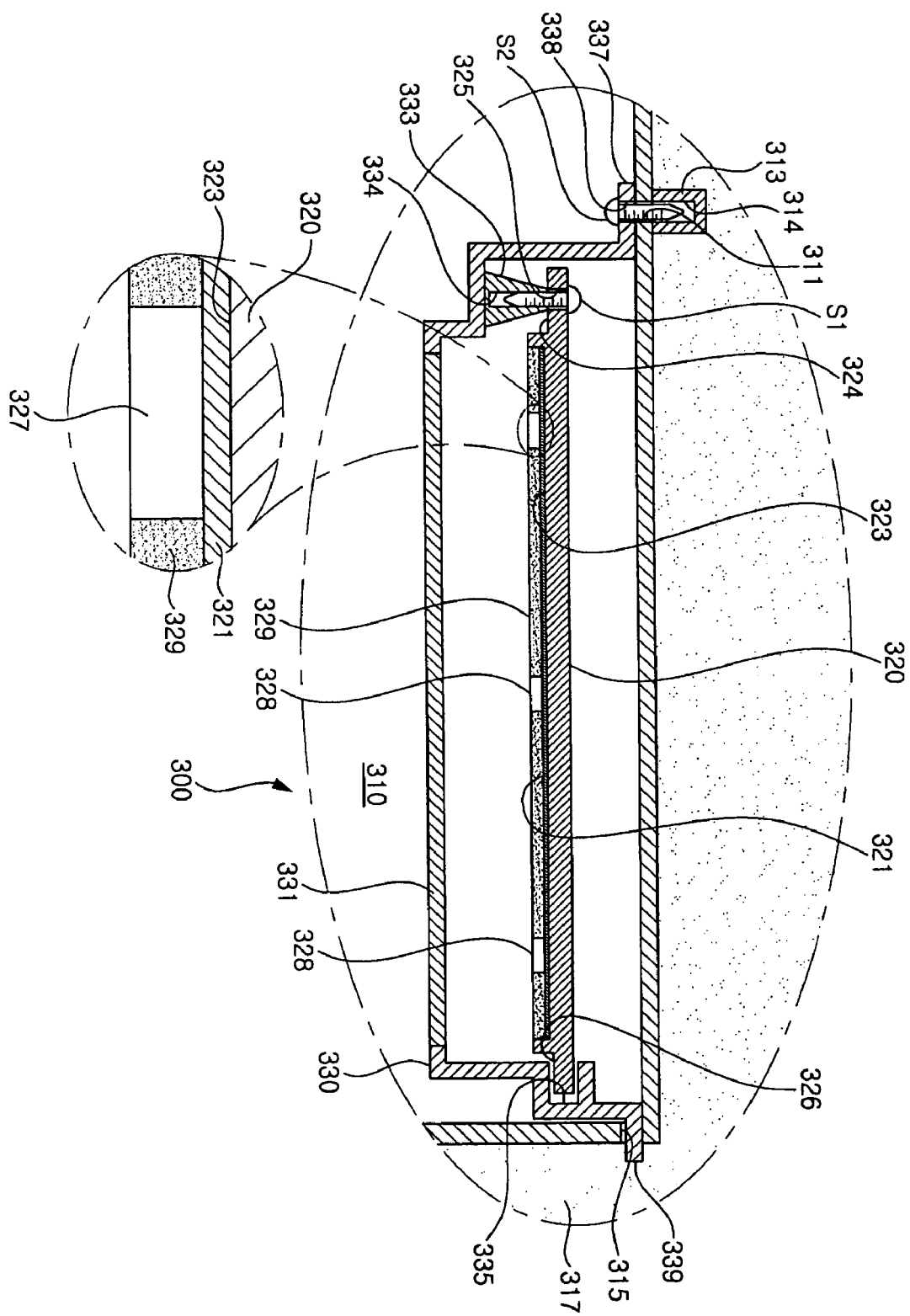
FIG. 6 is a sectional view showing the interior of a refrigerator provided with an illumination device of a refrigerator according to a third embodiment of the present invention.

FIG. 6 is a sectional view showing the interior of a refrigerator provided with an illumination device of a refrigerator according to a third embodiment of the present invention.

As shown in the figure, a predetermined storage space 310 is defined within a main body 310 of a refrigerator. An illumination device for illuminating the storage space 310 is provided at one side of 310. The illumination device includes an illuminating source and an illuminating cover 330.

The illuminating source serves to emit light and substantially illuminate the storage space 310. The illuminating source includes a heat radiation plate 320 provided with a printed circuit board 321 at a front surface thereof, a light emitting diode module installed to the printed circuit board 321 of the heat radiation plate 320, and a molding portion 329 molded on the surface of the heat radiation plate 320 formed with the printed circuit board 321.

The heat radiation plate 320 is formed of metal and extends in a longitudinal direction to radiate heat generated when the light emitting diodes 328 emit light. A seating recess 323 is formed by depressing a central portion of the heat radiation plate 320. The printed circuit board 321 is provided on an inner surface of seating recess 323 corresponding to a front surface of the heat radiation plate 320.

Stepped portions 324 and 326 with a thickness relatively smaller than that of the central portion are provided at both side ends of the heat radiation plate 320. The stepped portion 324 formed at the left end of the heat radiation plate 320 as viewed in this figure is formed with a through-hole 325.

The light emitting diode module comprises a plurality of light emitting diodes 328. The light emitting diodes 328 are installed on the printed circuit board 321 to be spaced apart from one another by predetermined intervals. When the light emitting diodes 328 are installed on the printed circuit board 321, front ends of the light emitting diodes are preferably coplanar with the front surface of the heat radiation plate 320 in which the seating recess 323 is formed. The light emitting diodes 328 emit light to illuminate the storage space 310. Each of the light emitting diodes 328 has high power, e.g. about 1 W, enough to illuminate the storage space 310.

Further, a molding portion 329 is provided in the interior of the seating recess 323 corresponding to the front surface of the printed circuit board 321. The molding portion 329 serves to prevent moisture from permeating the printed circuit board 321 or the light emitting diodes 328. The molding portion 329 is formed of a silicone material. A front surface of the molding portion 329 is coplanar with the front surface of the heat radiation plate 320. Since the light emitting diodes 328 are not buried in the molding portion 329, therefore, the illumination of the storage space 310 by the light emitting diodes 328 can be further efficiently made.

The illuminating cover 330 is provided in the front of the illuminating source, i.e. the light emitting diodes 328. The illuminating cover 330 is shaped as a flat hexahedron with an open back and serves to cover the illuminating source, i.e. substantially the light emitting diodes 328.

A front window 331 is provided at a front side of the illuminating cover 330. The front window 331 serves to transmit light from the light emitting diodes 328 into the storage space 310. The front window 331 is formed by partially opening the front side of the illuminating cover 330 or made of a transparent or translucent material.

A coupling boss 333 is formed at a left end on an inner surface of the front side of the illuminating cover 330. The coupling boss 333 protrudes rearward from the inner surface of the front side of the illuminating cover 330 by a predetermined height. The coupling boss 333 is formed with a coupling hole 334. The coupling screw S1, which penetrates the through-hole 325 of the stepped portion 324 formed at the left end of the heat radiation plate 320, is coupled with the coupling hole 334.

A coupling groove 335 is formed in an inner surface of a right side of the illuminating cover 330. The coupling groove 335 is opened leftward, i.e. toward a space defined by the illuminating cover 330, at a position on the inner surface of the right side of the illuminating cover 330 which is spaced apart from the inner surface of the front side of the illuminating cover 330 by a predetermined distance. The stepped portion 326 formed at a right end of the heat radiation plate 320 is fitted in the coupling groove 335.

Preferably, a tip end of the coupling boss 333 and the coupling groove 335 are spaced apart from the inner surface of the front side of the illuminating cover 330 by the same distance. Further, when the illuminating source is fixed to the illuminating cover 330, front and rear surfaces of the illuminating source are spaced apart from the inner surface of the front side of the illuminating cover 330 and the rear side of the storage space 310 by a predetermined interval, respectively. The reason is that the heat radiation plate 320 is prevented from coming into close contact with the rear side of the storage space 310 and/or the inner surface of the front side of the illuminating cover 330 to increase heat radiation efficiency.

In addition, a coupling bracket 337 is provided at a rear end of a left side of the illuminating cover 330. The coupling bracket 337 extends perpendicular to the left side of the illuminating cover 330, i.e. leftward as viewed in the figure, by a predetermined length. The coupling bracket 337 is formed with a through-hole 338.

A coupling piece 339 is provided at a rear end of the right side of the illuminating cover 330. The coupling piece 339 extends perpendicular to the right side of the illuminating cover 330, i.e. rightward as viewed in the figure, by a predetermined length.

Furthermore, a through-hole 311 is formed in the rear side of the storage space 310. The through-hole 311 of the storage space 310 is formed at a certain position on the rear surface of the storage space 310 corresponding to the through-hole 338 of the coupling bracket 337. A coupling bush 313 is provided at the back of the storage space 310, i.e. at the interior of the main body 300, corresponding to the through-hole 311 of the rear side of the storage space 310. The coupling bush 313 is formed with a coupling hole 314. A coupling screw S2, which sequentially penetrates the through-hole 338 of the coupling bracket 337 and the through-hole 311 of the storage space 310, is coupled with the coupling hole 314.

A coupling slot 315 is provided at a right side of the storage space 310. The coupling slot 315 is formed to extend in a vertical direction at a certain position on the right side of the storage space 310, i.e. at a corner between the rear and right sides of the storage space 310 as illustrated in the aforementioned embodiment, to correspond to the coupling piece 339. The coupling piece 339 is inserted in the coupling slot 315. The coupling piece 339 inserted in the coupling slot 315 is interference fitted into an insulating layer 317 provided in the main body 300 corresponding to the back of the storage space 310.

Hereinafter, a process of assembling a preferred embodiment of an illumination device according to the present invention so configured and then installing the assembled illuminating device in a storage space of a refrigerator will be described in more detail with reference to the accompanying drawings.

Figure 7A:
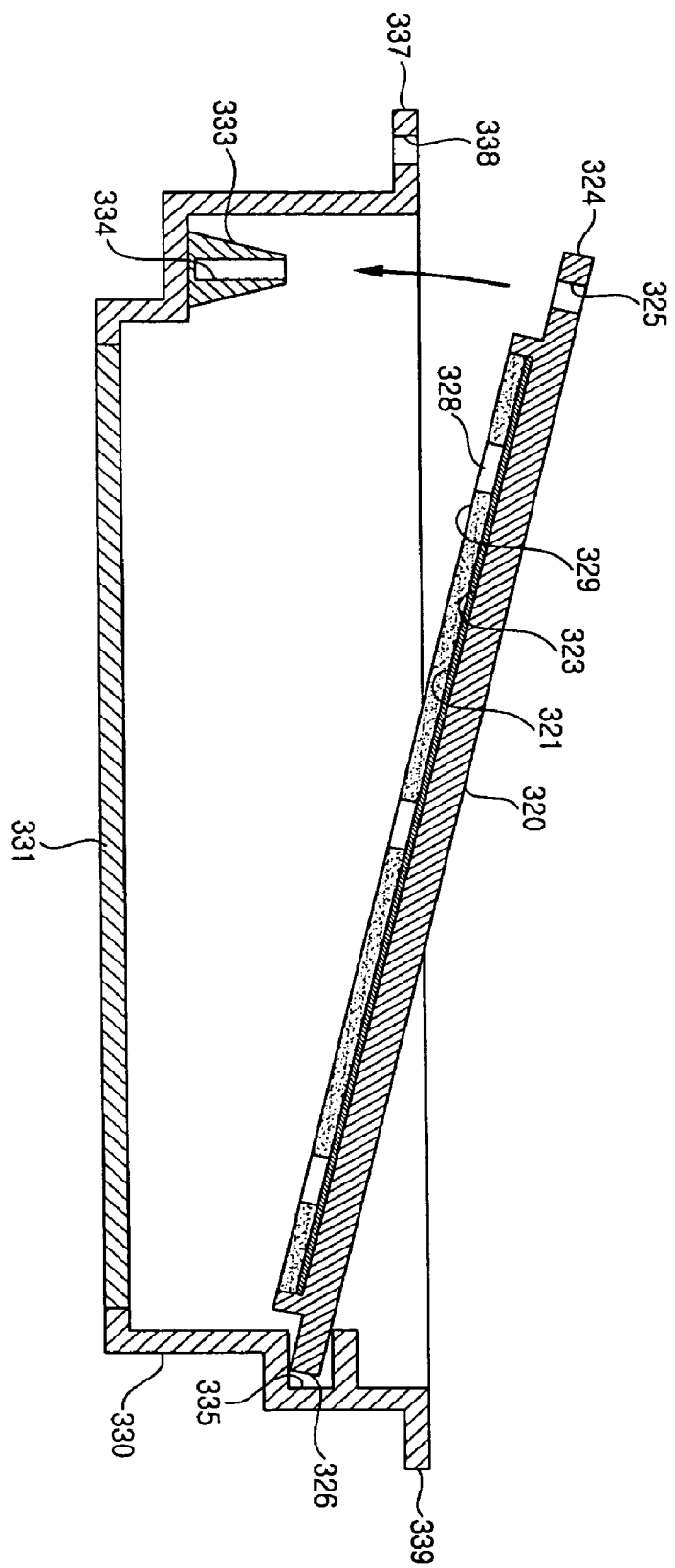
FIGS. 7a to 7c are views illustrating an operating process of installing the illumination device of the third embodiment of the present invention into the storage space of the refrigerator.
Figure 7B:
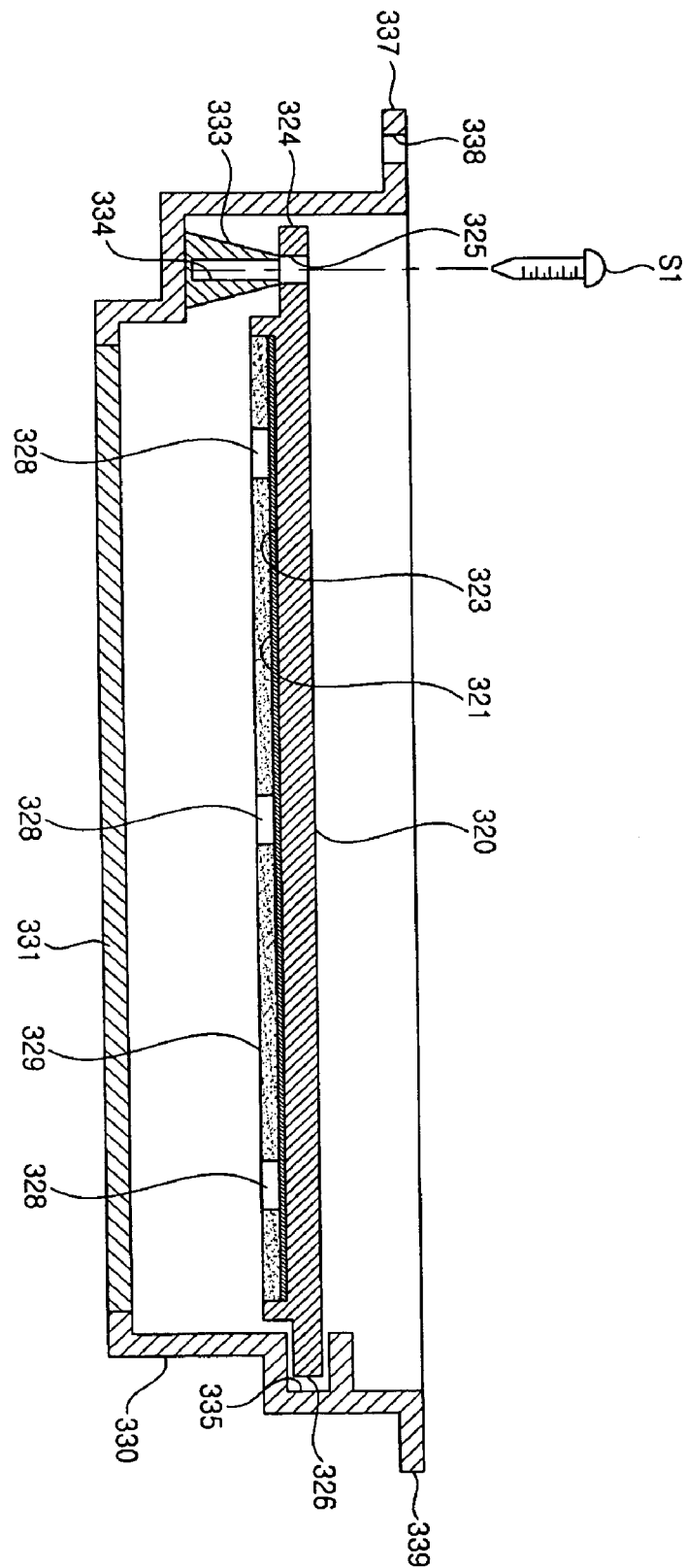
Figure 7C:
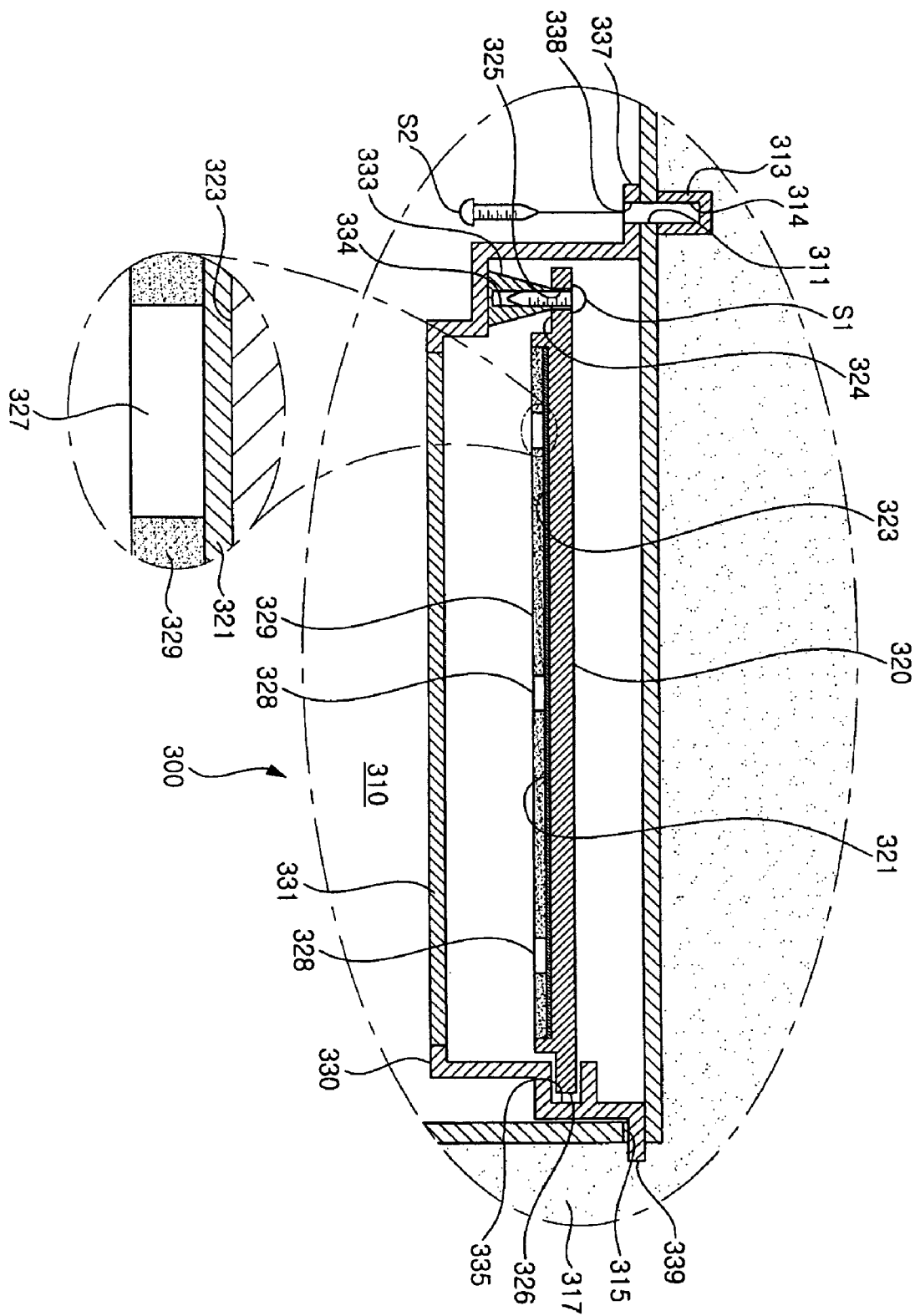

FIGS. 7a to 7c are views illustrating an operating process of installing the assembled illumination device of the third embodiment of the present invention into the storage space of the refrigerator.

Referring to FIG. 7c, the stepped portion 326 formed at the right end of the heat radiation plate 320 is first inserted in the coupling groove 335 of the illuminating cover 330. At this time, the heat radiation plate 320 is moved to allow the stepped portion 326 to be fastened into the coupling groove 335, at a predetermined angle with respect to the inner surface of the front side of the illuminating cover 330 in a state where the light emitting diodes 328 are directed to the inner surface of the front side of the illuminating cover 330.

As shown in FIG. 7b, in such a state, the heat radiation plate 320 is pivoted counterclockwise about the stepped portion 326 coupled with the coupling groove 335. Therefore, the through-hole 325 of the stepped portion 324 is positioned to correspond to the coupling boss 333 of the illuminating cover 330. The screw S1 that has penetrated the through-hole 325 of the stepped portion 324 is fastened into the coupling boss 333, and thus, the illuminating source is fixed to the illuminating cover 330. That is, the assembly of the illumination device is completed.

Next, as shown in FIG. 7c, the coupling piece 339 of the illuminating cover 330 is inserted in the coupling slot 315 of the storage space 310. The coupling piece 339 inserted in the coupling slot 315 is interference fitted and fixed to the insulating layer 317 provided in the main body 300 corresponding to the back of the storage space 310.

At this time, depending on a lateral width of the storage space 310, the illuminating cover 330 is moved at a predetermined angle with respect to or in parallel with the rear side of the storage space 310 such that the coupling piece 339 can be fastened to the coupling slot 315. Further, the through-hole 338 of the coupling bracket 337 is positioned to correspond to the through-hole 311 of the storage space 310.

In such a state, the screw S2 that sequentially penetrated the through-hole 338 of the coupling bracket 337 and the through-hole 311 of the storage space 310 is fastened into the coupling hole 314 of the coupling bush 313 provided in the main body 300 corresponding to the back of the storage space 310. The coupling bush 313 is temporarily fixed in the main body 300 before foam liquid for forming the insulating layer 317 is filled, and then, is finally fixed at a certain position, i.e. a position corresponding to the through-hole 311 of the storage space 310, as the insulating layer 317 is formed due to the solidification of foam liquid. Therefore, the illumination device can be installed at one side of the storage space 310.

Hereinafter, fourth to sixth embodiments of an illumination device for a refrigerator according to the present invention will be described in detail with reference to the accompanying drawings.

Figure 8:
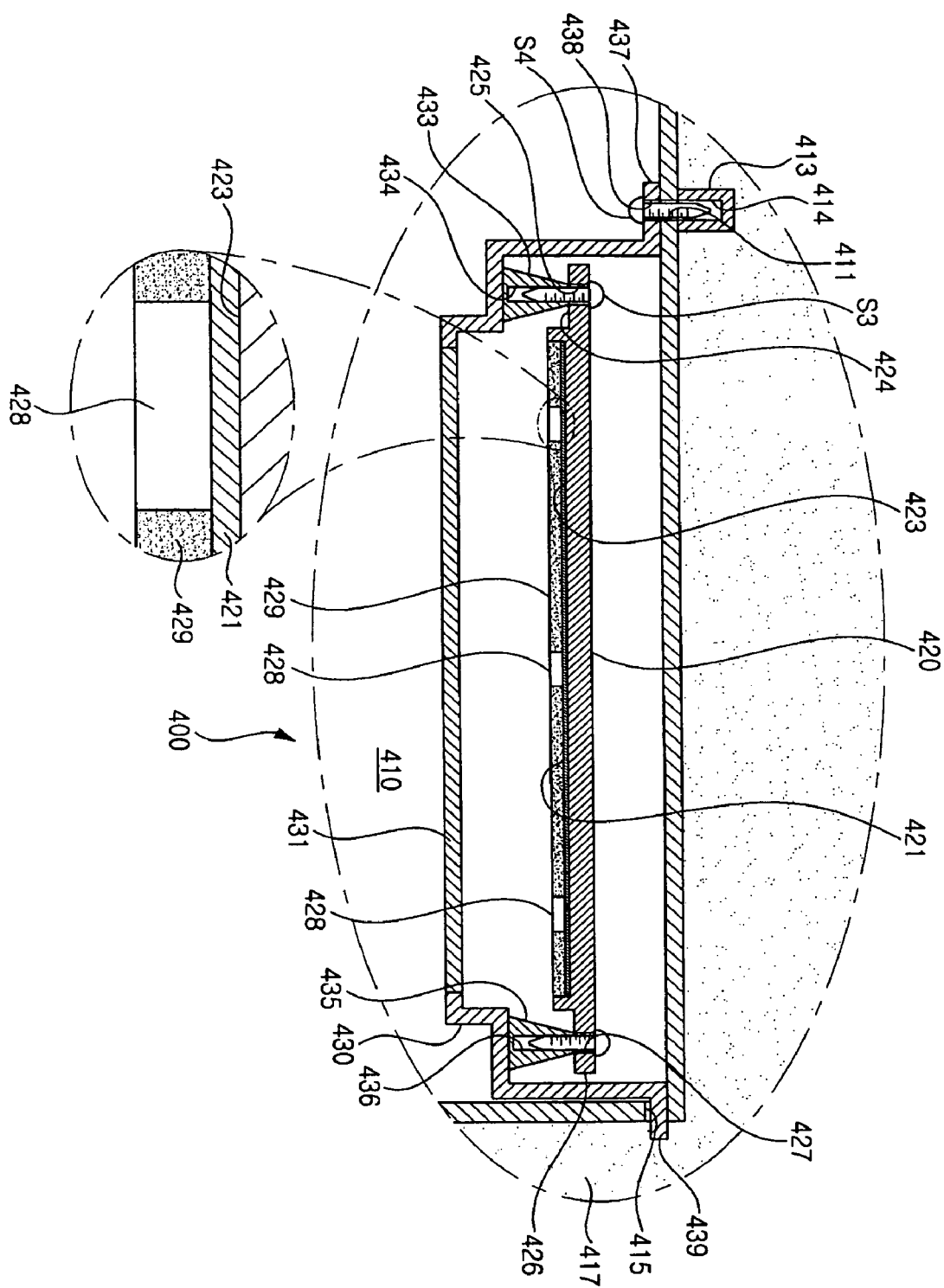
FIG. 8 is sectional view showing the interior of a refrigerator provided with an illumination device of a refrigerator according to a fourth embodiment of the present invention.
Figure 9:
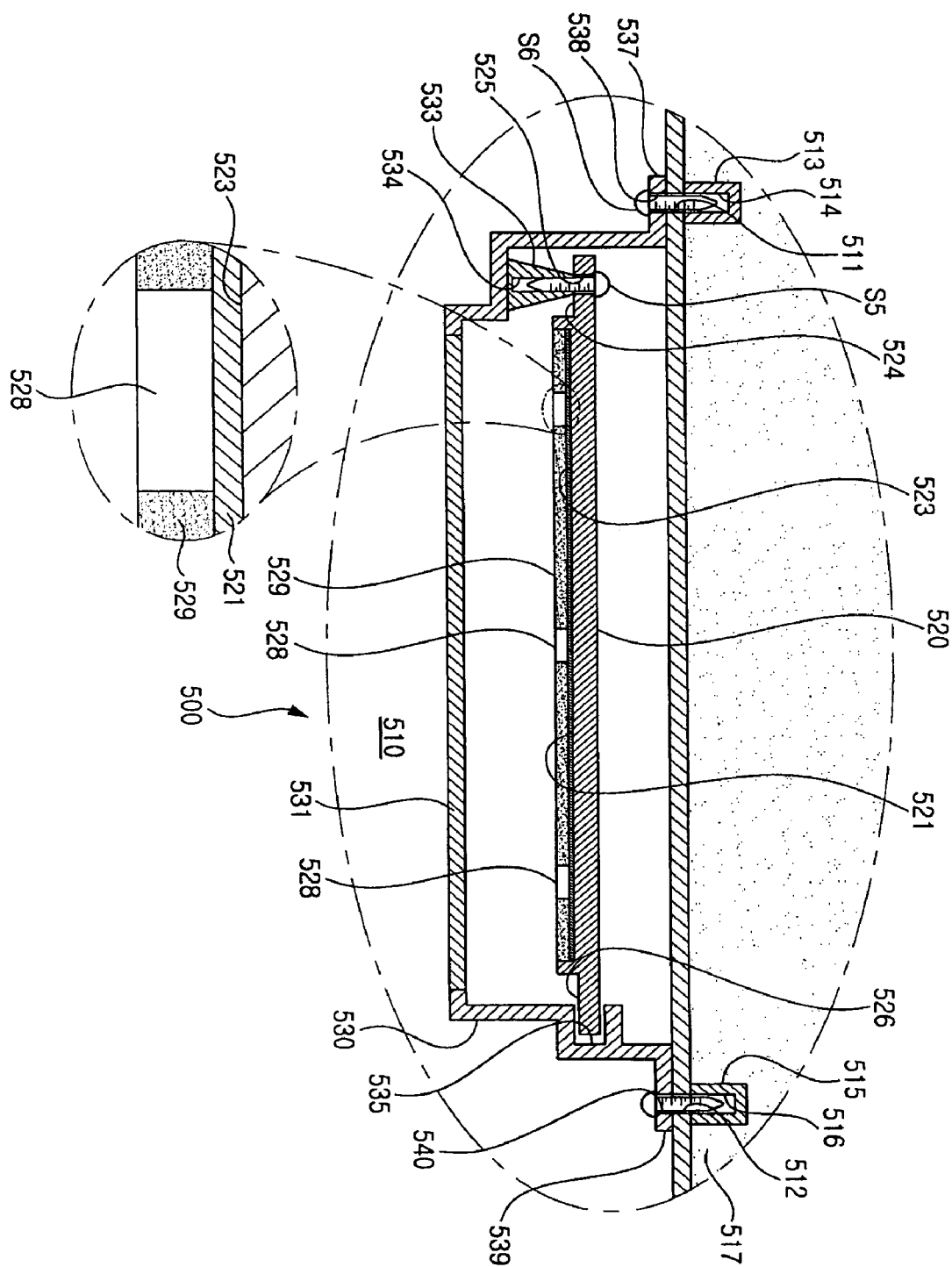
FIG. 9 is sectional view showing the interior of a refrigerator provided with an illumination device of a refrigerator according to a fifth embodiment of the present invention.
Figure 10:
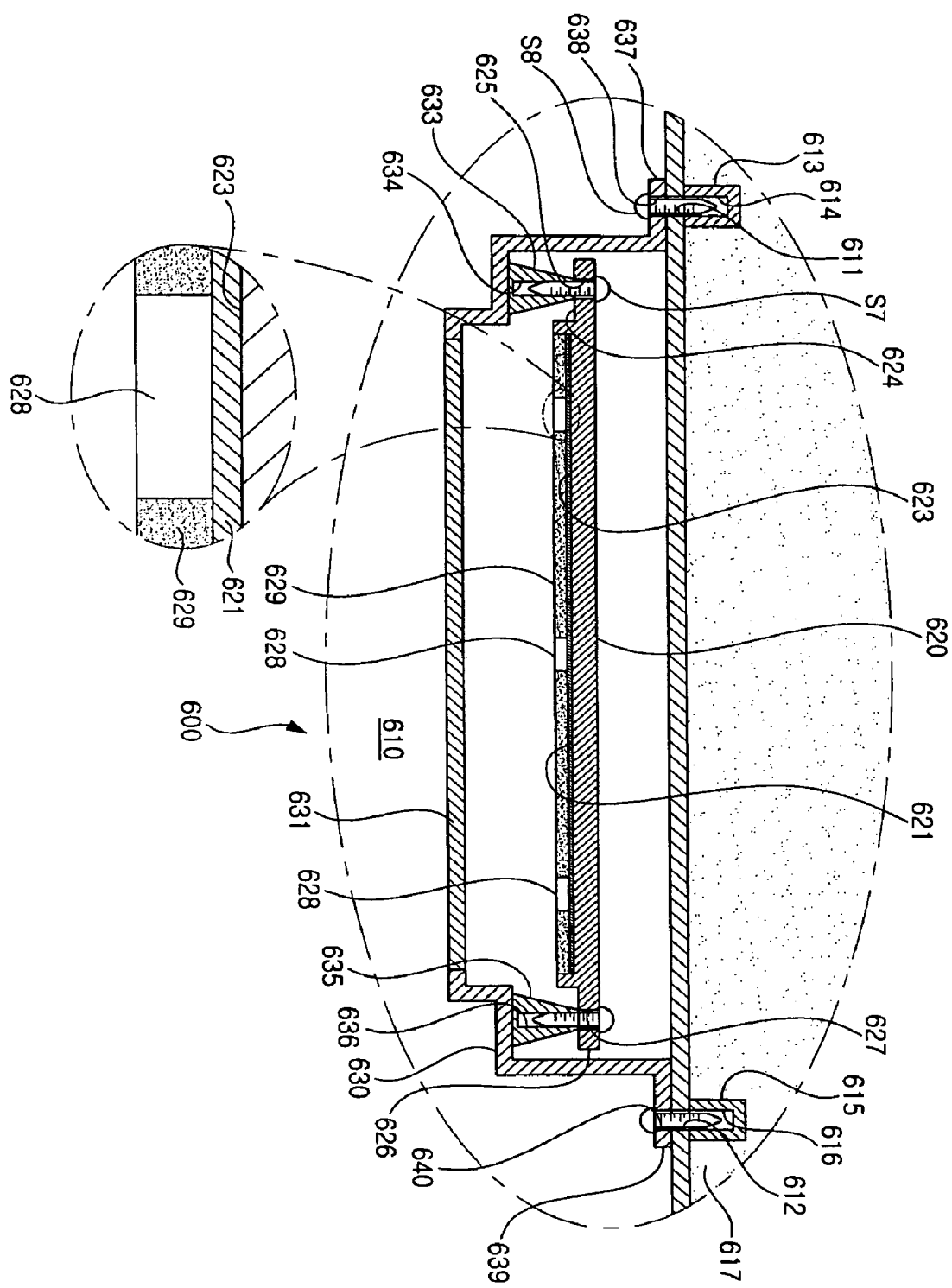
FIG. 10 is sectional view showing the interior of a refrigerator provided with an illumination device of a refrigerator according to a sixth embodiment of the present invention.
Figure 11:
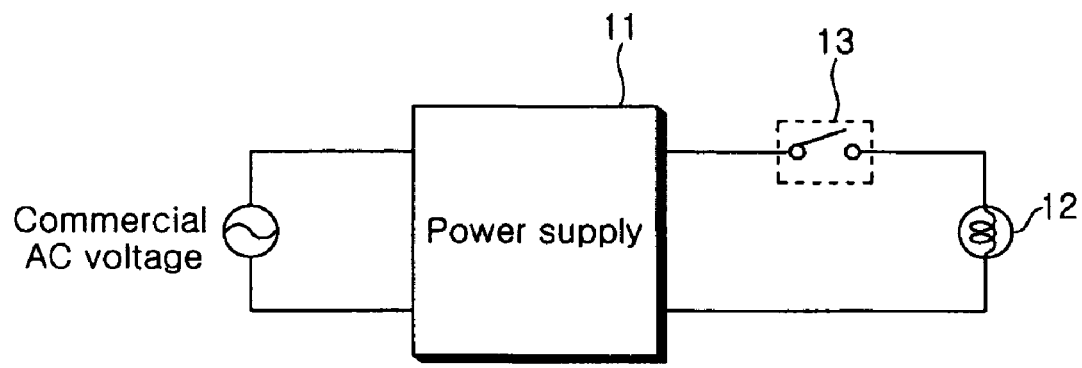
FIG. 11 is a view schematically showing the configuration of an illumination device according to a prior art.
Figure 12:
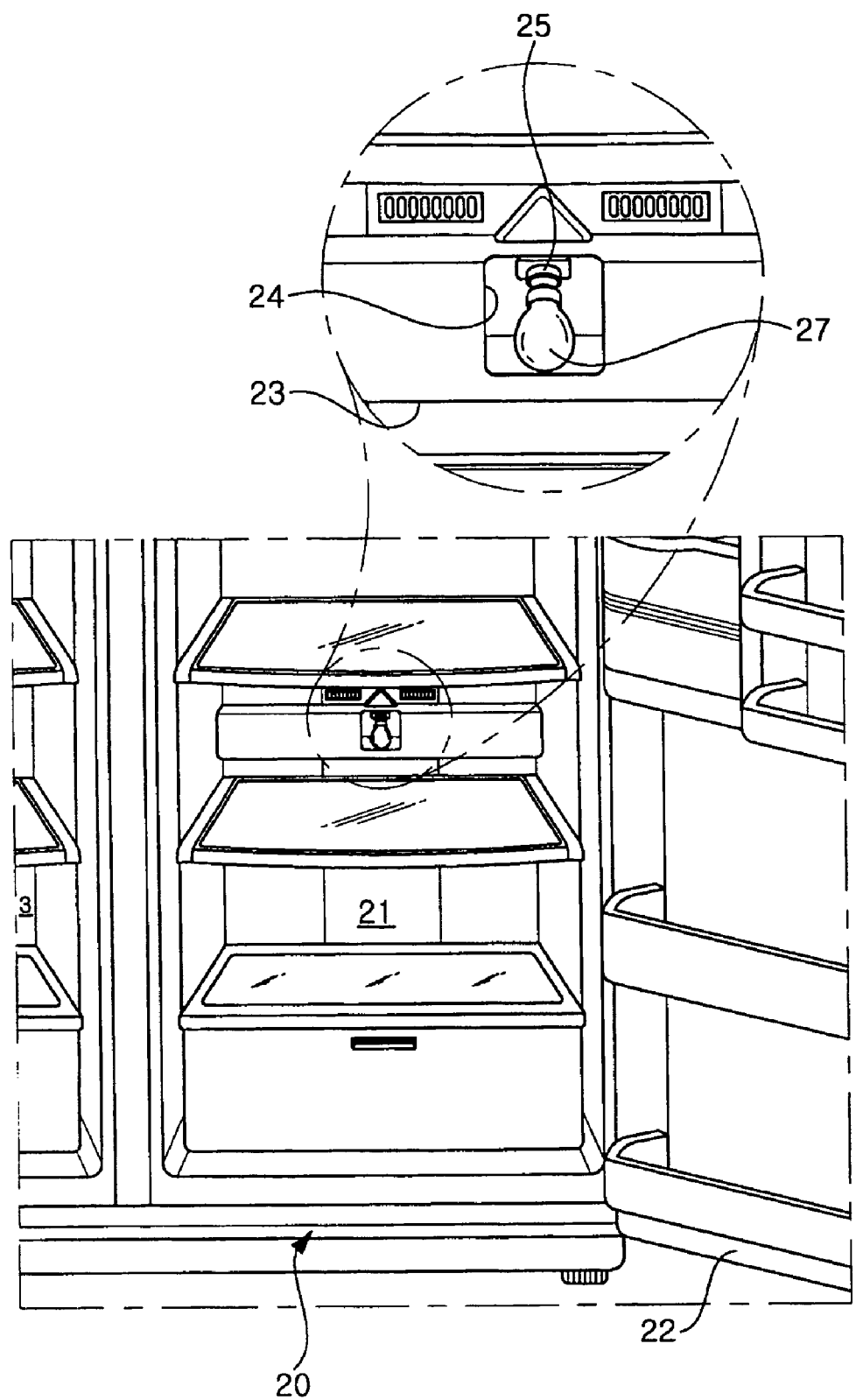
FIG. 12 is a front view showing the interior of a refrigerator provided with the illumination device according to the prior art.

FIGS. 8 to 10 are sectional views showing the fourth to sixth embodiments of the illumination device for a refrigerator according to the present invention.

In the fourth embodiment of the present invention shown in FIG. 8, through-holes 425 and 427 are formed in the stepped portions 424 and 426 provided on lateral ends of a heat radiation plate 420 constituting an illuminating source, respectively. Coupling bosses 433 and 435 are provided at lateral ends on an inner surface of a front side of an illuminating cover 430 corresponding to the through-holes 425 and 427 of the stepped portions 424 and 426, respectively. Then, as a screw S3 that penetrated the through-hole 425 or 427 of the stepped portion 424 or 426 is fastened to a through-hole 434 or 436, the illuminating source is fixed to the illuminating cover 430.

The configuration for fixing the illuminating cover 430 into a storage space 410 is the same as that of the third embodiment of the present invention shown in FIG. 6. That is, a coupling bracket 437 and a coupling piece 439 are provided at rear ends of both lateral sides of the illuminating cover 430, respectively, and the coupling bracket is provided with a through-hole 438. A through-hole 411 is provided at a rear side of the storage space 410, and a coupling boss 413 is provided at the back of the storage space 410 corresponding to the through-hole 411 of the storage space 410. Further, a coupling slot 415 is provided at a right side of the storage space 410. The coupling piece 439 is inserted in the coupling slot 415, and the illuminating cover 430 is fixed into the storage space 410 as a coupling screw S4 (←S2) that sequentially penetrated the through-hole 438 of the coupling bracket 437 and the through-hole 411 of the storage space 410 is fastened into a coupling hole 414 of the coupling boss 413.

In the fifth embodiment of the present invention shown in FIG. 9, the configuration for fixing an illuminating source and an illuminating cover 530 to each other is the same as that of the third embodiment of the present invention shown in FIG. 6. That is, a coupling hole 525 is formed at a stepped portion 524 provided at a left end of a heat radiation plate 520 constituting an illuminating source. A coupling boss 533 is provided at a left end on an inner surface of a front side of the illuminating cover 530, and a coupling groove 535 is provided at an inner surface of a right side of the illuminating cover 530. The illuminating source is fixed to the illuminating cover 530, as a coupling screw S5 that penetrated the through-hole 525 of the stepped portion 524 provided at the left (←right) end of the heat radiation plate 520 is fastened into a coupling hole 534 of the coupling boss 533 in a state where a stepped portion 526 provided at a right end of the heat radiation plate 520 is inserted in the coupling groove 535.

However, the configuration for fixing the illuminating cover 530 to a storage space 510 is different from those of the embodiments shown in FIGS. 6 and 8. That is, coupling bosses 537 and 539 are provided at rear ends of the lateral sides of the illuminating cover 530, respectively; and through-holes 538 and 540 are formed in coupling brackets 537 and 539, respectively. Through-holes 511 and 512 corresponding respectively to the through-holes 538 and 540 of the coupling brackets 537 and 539 are formed in a rear side of the storage space 510; and coupling bosses 513 and 515 are provided at the back of the storage space 510 corresponding to the through-holes 511 and 512 of the storage space 510, respectively. The illuminating cover 530 is fixed into the storage space 510, as screws S6 that sequentially penetrated the through-holes 538 and 540 of the coupling brackets 537 and 539 and the through-holes 511 and 512 of the storage space 510 are fastened into coupling holes 514 and 516 of the coupling bosses 513 and 515, respectively.

Furthermore, in the sixth embodiment of the present invention shown in FIG. 10, the fixation between an illuminating source and an illuminating cover 630 and the fixation between the illuminating cover 630 and a storage space 610 are performed by means of coupling screws S7 and S8. Through-holes 625 and 627 are formed in stepped portions 624 and 626 provided at both lateral ends of the illuminating source, respectively. Coupling bosses 633 and 635 are provided at both lateral ends on an inner surface of a front side of the illuminating cover 630, respectively, to correspond to the through-holes 625 and 627. Then, the illuminating source and the illuminating cover 630 are fixed to each other, as screws S7 that penetrated the through-holes 625 and 627 of the stepped portions 624 and 626 are fastened into through-holes 634 and 627 of the coupling bosses 633 and 635.

Further, coupling brackets 637 and 639 formed with through-holes 638 and 640 are provided at rear ends of both lateral sides of the illuminating cover 630, respectively. Through-holes 611 and 612 corresponding respectively to the through-holes 638 and 640 of the coupling brackets 637 and 639 are formed in a rear side of the storage space 610; and coupling bosses 613 and 615 are provided at the back of the storage space 610 corresponding to the through-holes 611 and 612 of the storage space 610, respectively. The illuminating cover 630 is fixed into the storage space 610, as screws S8 that sequentially penetrated the through-holes 638 and 640 of the coupling brackets 637 and 639 and the through-holes 611 and 612 of the storage space 610 are fastened into coupling holes 614 and 616 of the coupling bosses 613 and 615, respectively.

An illumination device for a refrigerator according to the present invention so configured has the following advantages:

A rated voltage of a light emitting diode module is identical to that of a halogen lamp used as a conventional light source. Therefore, the light emitting diode module can be used as a light source without changing the design of other parts in the conventional illumination device.

Further, light emitting diode module comprises a plurality of light emitting diodes. Therefore, brightness enough to illuminate a storage space of a refrigerator can be ensured.

Light from the light emitting diodes propagates toward the storage space along a light transmissive member. Therefore, since light from the light emitting diode module is not blocked by foods stored in the storage space, the storage space can be more efficiently illuminated.

Moreover, the light emitting diode module used as a light source in the present invention has a smaller amount of heat radiation but relatively longer life as compared with the conventional halogen lamp. Therefore, the reduction in refrigeration efficiency of a refrigerator can be minimized and the number of times of replacing light source can also be reduced.

In addition, the light emitting diode module is provided in the interior of a shelf. Therefore, since the configuration for illuminating the storage space does not protrude into the storage space, the storage capacity of a refrigerator can be increased. As a result, the refrigerator can be efficiently employed. Further, since the storage space is simplified, it is possible to make a luxurious image of products.

The light emitting diode module with a relatively smaller volume as compared with the conventional halogen lamp can be used to illuminate the storage space. Therefore, a phenomenon in which the configuration for illuminating the storage space and particularly the light emitting diodes are damaged while a refrigerator is utilized can be minimized. Thus, durability of products can be improved.

Furthermore, the light emitting diode module and the illuminating cover are installed in the storage space in a state where they are assembled into one unit. Therefore, since working hours needed to install the configuration for illuminating the storage space into the storage space are reduced, efficiency of manufacturing products can be enhanced.

Although the present invention has been described in connection with the embodiment of the present invention illustrated in the accompanying drawings, the present invention is not limited thereto and it is apparent to those skilled in the art that various modifications and changes can be made thereto without departing from the spirit and scope of the invention. Accordingly, the present invention should be construed based on the appended claims.

What is claimed is:

1. An illumination device for a refrigerator, comprising:
   an illuminating source that illuminates a storage space, wherein the illuminating source comprises:
      a heat radiation plate provided with a printed circuit board at one surface thereof;
      a light emitting diode module installed on the printed circuit board; and
      a molding portion molded onto the surface of the heat radiation plate formed with the printed circuit board;
   an illuminating cover installed at one side of the storage space in a state where the illuminating source is mounted thereto;
   a first fixing device that fixes the illuminating source to the illuminating cover, wherein the first fixing device comprises:
      at least one pair of through-holes formed at both lateral ends of the heat radiation plate; and
      at least one pair of coupling bosses provided at positions on an inner surface of the illuminating cover corresponding to the through-holes such that coupling screws penetrated the through-holes of the heat radiation plate are fastened into the coupling bosses; and
   a second fixing device that fixes the illuminating cover to the storage space, wherein the second fixing device includes:
      at least one through-hole formed at one lateral side of the illuminating cover;
      at least one coupling piece provided at the other side of the illuminating cover opposite to the through-hole;
      at least one through-hole formed on a side of the storage space corresponding to the through-hole of the illuminating cover;
      at least one coupling bush formed at the back of the storage space corresponding to the through-hole in the storage space such that a coupling screw sequentially penetrated the through-hole of the illuminating cover and the through-hole in the storage space is fastened to the coupling bush; and
      at least one coupling slot formed at another side of the storage space corresponding to the coupling piece of the illuminating cover such that the coupling piece of the illuminating cover is inserted in the slot.

2. A refrigerator comprising the illumination device of claim 1, wherein the light emitting diode module is installed on a rear end of a ceiling of the refrigerator.

3. An illumination device for a refrigerator, comprising:
   an illuminating source that illuminates a storage space, wherein the illuminating source comprises:
      a heat radiation plate provided with a printed circuit board at one surface thereof;
      a light emitting diode module installed on the printed circuit board; and
      a molding portion molded onto the surface of the heat radiation plate formed with the printed circuit board;
   an illuminating cover installed at one side of the storage space in a state where the illuminating source is mounted thereto;
   a first fixing device that fixes the illuminating source to the illuminating cover, wherein the first fixing device comprises:
      at least one through-hole formed at one lateral end of the heat radiation plate; and
      at least one coupling boss provided at a position on an inner surface of the illuminating cover corresponding to the through-hole such that coupling screw penetrated the through-hole of the heat radiation plate is fastened into the coupling boss; and
      at least one coupling groove provided at another position on the inner surface of the illuminating cover opposite to the coupling boss such that the other lateral end of the heat radiation plate opposite to the through-hole is inserted in the coupling groove; and
   a second fixing device that fixes the illuminating cover to the storage space wherein the second fixing device comprises:

at least one through-hole formed at one lateral side of the illuminating cover;

at least one coupling piece provided at the other side of the illuminating cover opposite to the through-hole;

at least one trough-hole formed on a side of the storage space corresponding to the through-hole of the illuminating cover;

at least one coupling bush formed at the back of the storage space corresponding to the through-hole in the storage space such that a coupling screw sequentially penetrated the through-hole of the illuminating cover and the through-hole in the storage space is fastened to the coupling bush; and at least one coupling slot formed at another side of the storage space corresponding to the coupling piece of the illuminating cover such that the coupling piece of the illuminating cover is inserted in the slot.

4. A refrigerator comprising the illumination device of claim 3, wherein the light emitting diode module is installed on a rear end of a ceiling of the refrigerator.

\* \* \* \* \*